Nov. 14, 1939.   W. H. HUNT   2,179,821
FISH-RIBBING MACHINE AND METHOD
Filed Jan. 3, 1936   4 Sheets-Sheet 1

INVENTOR.
William H. Hunt
BY
Darby & Darby
ATTORNEYS

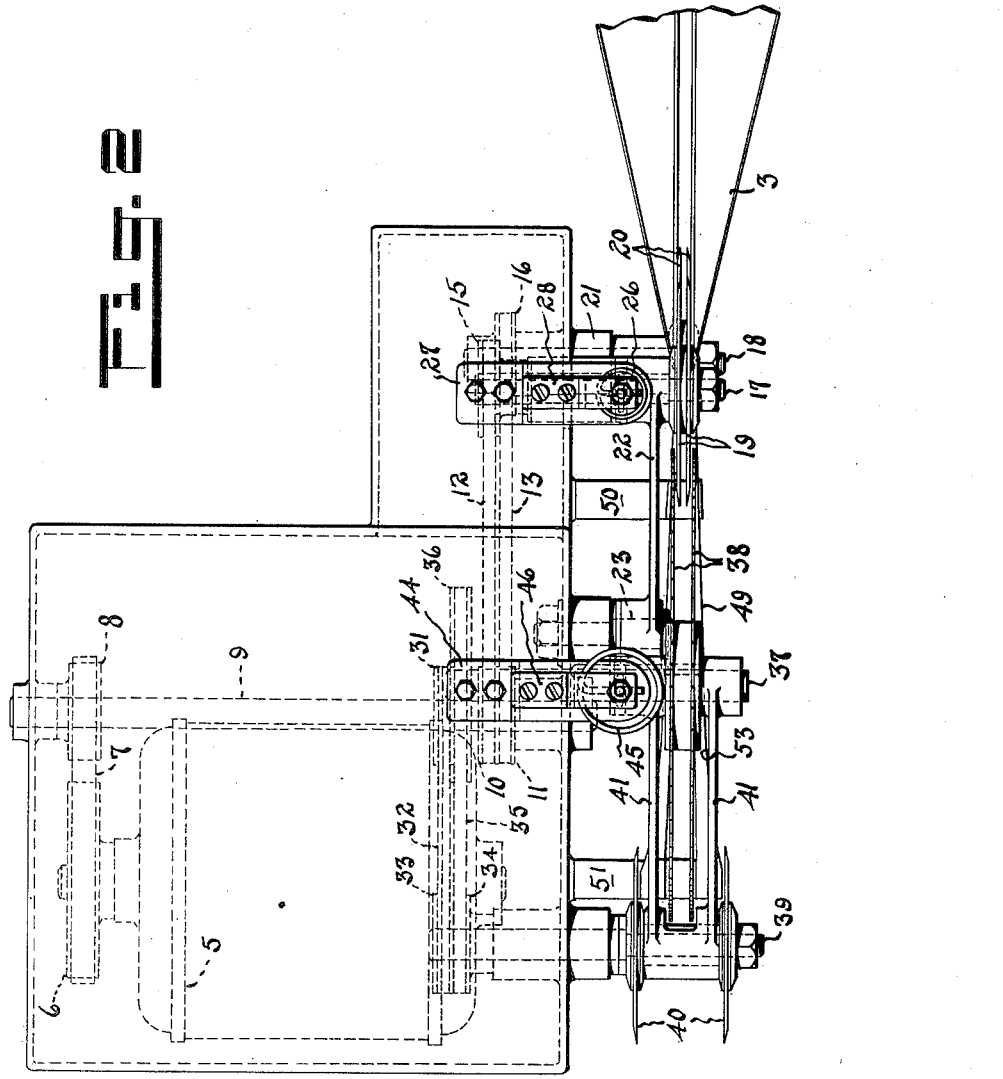

Nov. 14, 1939.　　　　W. H. HUNT　　　　2,179,821
FISH-RIBBING MACHINE AND METHOD
Filed Jan. 3, 1936　　　　4 Sheets-Sheet 3
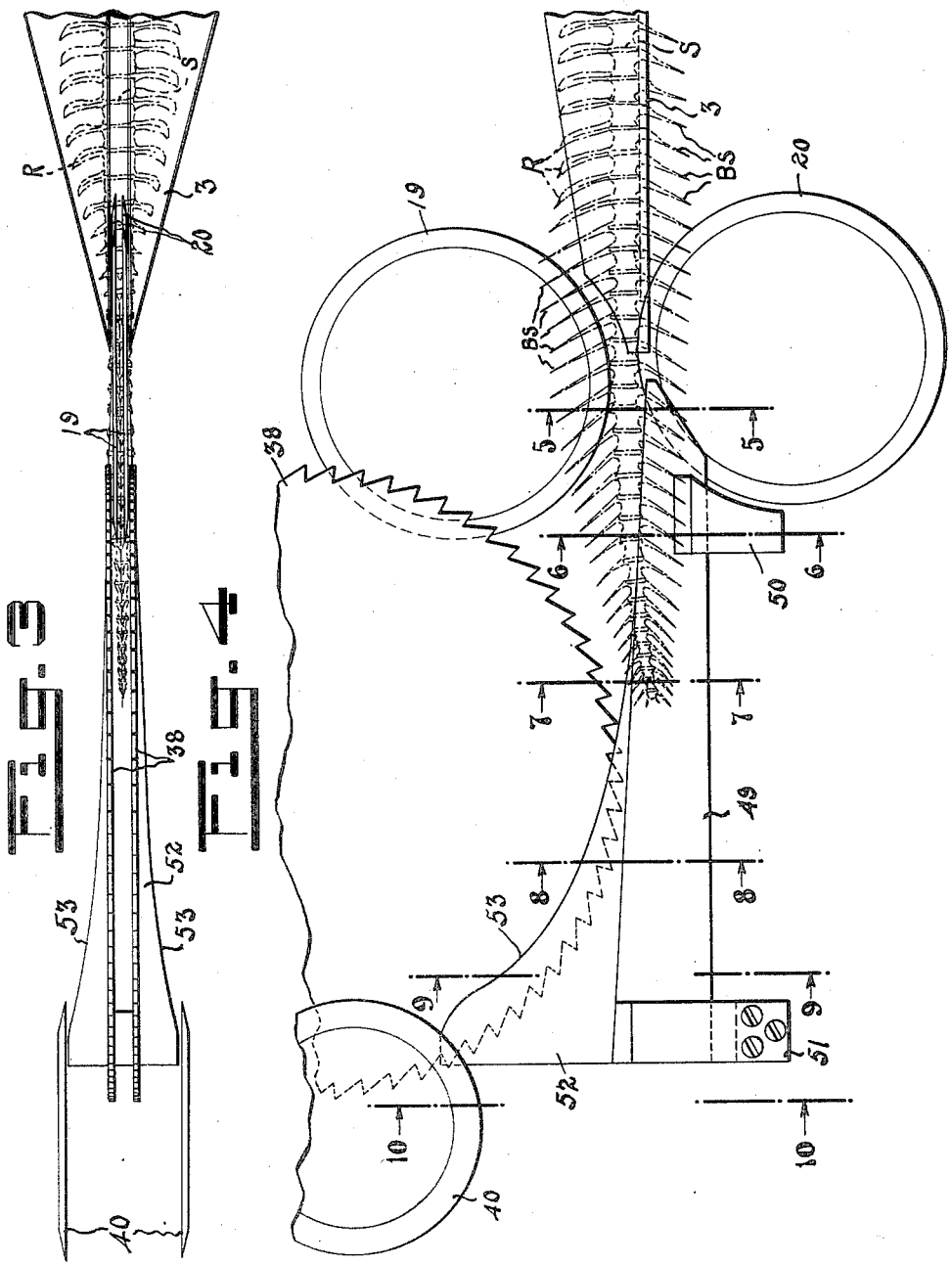
INVENTOR.
William H. Hunt
BY
Darby & Darby
ATTORNEYS

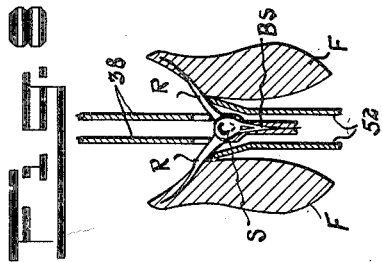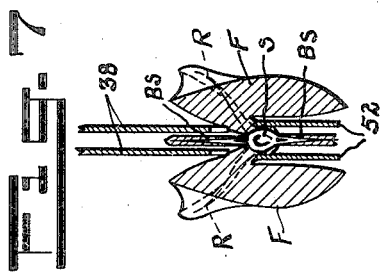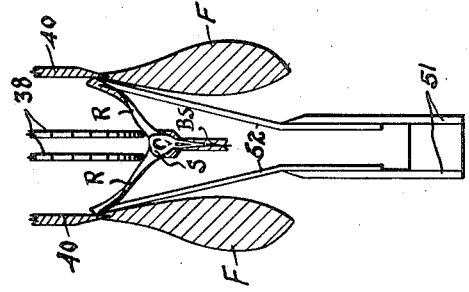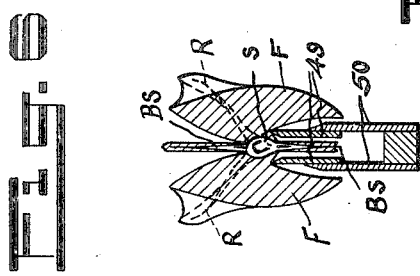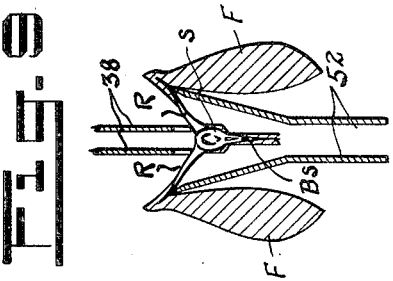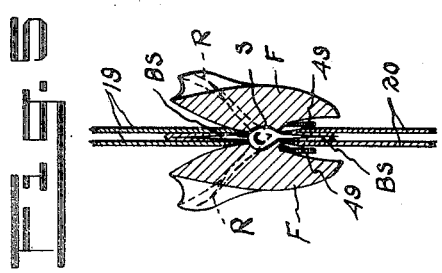

Patented Nov. 14, 1939

2,179,821

UNITED STATES PATENT OFFICE 2,179,821

FISH-RIBBING MACHINE AND METHOD

William H. Hunt, National City, Calif., assignor to Fish Machinery Corporation, San Diego, Calif., a corporation of California Application January 3, 1936, Serial No. 57,340

31 Claims. (Cl. 17—3)

This invention relates to improvements in machines for removing the skeleton of a fish to provide fillets.

The basic object of this invention is to provide a machine through which a headed fish may be passed for the purpose of removing a maximum amount of the flesh from the skeleton.

The machine of this invention is particularly directed to the operation of scraping or removing the flesh from the ribs of a fish, although there is shown additional mechanism by means of which the flesh is also severed from the back and belly spines.

A more specific object of this invention is to provide an improved form of ribbing knife which has longitudinally curved cutting edges, which edges diverge so that the cutting edges will closely hug the outer sides of the ribs of the fish and scrape the flesh therefrom.

These and many other objects as will become apparent from the following description are successfully secured by means of the machine and method of this invention.

This invention relates to and the mechanism thereof may be included as a part of the complete filleting machine disclosed in my co-pending application Serial No. 754,727, filed November 26, 1934, now Patent No. 2,149,021, dated February 28, 1939, for Means and method of filleting fish.

This invention resides substantially in the combination, construction, arrangement, relative location of parts, steps and series of steps, all as will be set forth in complete detail below.

In the accompanying drawings,

Figure 2 is a top plan view thereof;

Figure 3 is a top plan view somewhat in diagrammatic form of the ribbing knives and associated circular knives;

Figure 4 is a side elevational view thereof; and

Figures 5, 6, 7, 8, 9 and 10 are cross-sectional views taken on the corresponding section lines shown in Figure 4.

Figure 1:
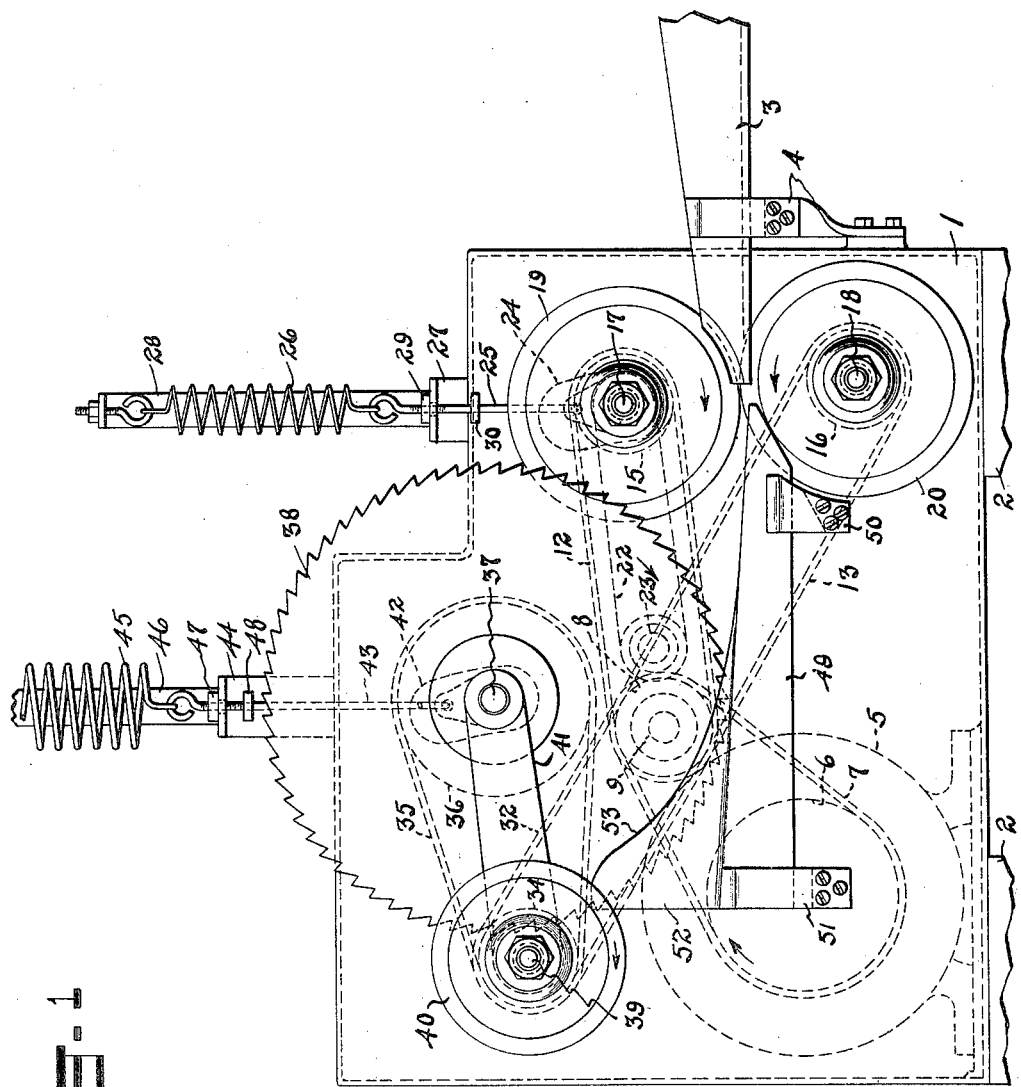
Figure 1 is a side elevational view of one form of machine in accordance with the principles of this invention.

In a machine for filleting fish the major consideration which marks such machine as successful is that of recovery of flesh from the bony framework of the fish. Heretofore many attempts have been made to fillet fish by machine methods. All of these attempts have failed because the machines which were devised were incapable of removing substantially all of the flesh from the skeleton of the fish. Any machine for this purpose should be capable of removing the flesh, and preferably in the form of two fillets, from a fish skeleton at least as well as may be accomplished by hand. It is desirable, of course, to effect even a greater recovery than is possible by hand and the nearer the machine approaches maximum recovery the more desirable it becomes as a commercial proposition.

The greatest difficulty has been experienced in machine methods in removing the flesh from the sides of the ribs. The most important feature of this invention involves the particular construction of the ribbing knives by means of which substantially all of the flesh is removed from the ribs and attached to the remainder of the flesh of the fish which has been severed from the back and belly spines.

The construction of the machine will first be described in detail. It is shown as comprising a casing 1 mounted on legs or standards 2 and housing a drive motor 5, which may conveniently be an electric motor as illustrated. At 3 is a guide and supply chute supported from the casing by means of a bracket 4 over which headed fish are moved in the direction of their length, back down and tail first.

The shaft of the motor is provided with a drive pulley 6 which is connected by means of a belt 7 to a driven pulley 8 secured to the shaft 9 journalled in the casing. Towards the other end of this shaft is provided a pair of pulleys 10 and 11 which are connected by the belts 12 and 13 to the pulleys 15 and 16 respectively. Pulley 15 is secured to shaft 17 which is journalled in a bearing formed on the end of lever 22, which lever is pivotally mounted on a short shaft 23 supported on the housing. Pulley 16 is secured to a shaft 18 which is journalled in the bearing 21 mounted on the housing.

Secured to shaft 17 for rotation therewith is a pair of parallel circular knives 19 positioned above the path of movement of the fish. Similarly, there is secured to the shaft 18 a pair of circular cutting knives 20 mounted below the path of movement of the fish. The knives of each of these pairs of knives, as will be apparent from Figure 2, are spaced from each other a sufficient distance, as illustrated in Figure 3, to permit the back and belly spikes to just pass therebetween. The free end of lever 22 is connected to a vertically slidable rod 25 which passes through an aperture in the support 27 secured to the top of the casing. The upper end of the rod is connected to a coiled spring 26 which is attached at its upper end to a support 28 mounted on the bracket 27. At 29 and 30 are a pair of adjustable stop nuts for engaging the bracket 27 to limit the vertical movement of rod 25 and hence the vertical swinging movement of the knives 19 about the pivot pin 23. The casing 1 is provided with a slot 24 to permit of the swinging movement of the shaft 17 which lies in the slot.

Shaft 9 is also provided with the pulley 31 which is connected by belt 32 to a pulley 33 mounted on the shaft 39 which is journalled in the housing. Shaft 39 is provided with a pair of parallel spaced circular knives 40. Pivotally mounted on shaft 39, so as to pivot thereon without turning with it, is a double armed lever 41, in the end of which is journalled a shaft 37. This shaft is provided with a pulley 36 driven by means of the belt 35 by a pulley 34 on the shaft 39. Secured to shaft 37 for rotation with it is a pair of spaced toothed wheels 38. The shaft 37 passes through a slot 42 in the housing so that it may move with the lever 41. The end of the lever 41 is connected to a support 46 mounted on the housing by means of a spring 45 and the rod 43. This rod passes through an aperture in the bracket 44 likewise mounted on the housing. A pair of adjustable stop nuts 47 and 48 are provided to limit the vertical movement of the rod 43 and hence the toothed wheels 38.

At 49 are a pair of spaced knives which are supported from the housing by means of the brackets 50 and 51. These knives are spaced apart, as is clear from Figures 5 and 6, and are provided at the top with sharp cutting edges. The forward extremities of the cutting edges of the knives 49 are straight and substantially horizontal. To the rearward of the forward extremities of the knives 49 the cutting edges merge into the longitudinally curved cutting edges 53 formed on the rearward portion 52 of these knives. Thus from the forward extremities to the rear extremities the cutting edge is continuous and comprises initially straight portions merging into longitudinally curved portions. In addition, as is clear from Figure 3 and the various sectional views, Figures 5 to 10, inclusive, these knives diverge outwardly from the forward extremities to the rear ends thereof.

It is noted that the sides of the knives are straight as is clear from Figs. 9 to 10, inclusive. The cutting edges in back of the forward extremities are longitudinally curved, as is clear from Figure 1. However, because of the divergence of these cutting edges they appear in Figure 3 to be formed on knives which are longitudinally curved. However, as stated above, this is not true, since the knives are flat at the sides. It will be noted from Figure 1 that the delivery chute 3 somewhat overlaps the circular knives 19 and 20, which intersect them, as shown in Figure 1. The delivery chute 3 is shown formed of two members spaced apart, as is clear from Figure 2, to provide a space in which the back spikes may move, as is clear from Figure 4. The circular knives 19 and 20 are disposed above each other and lie between the chute portions. Likewise, as is clear from Figure 2, the circular knives 19 overlap the toothed wheels 38 and lie between them. The toothed wheels 38 are mounted above the ribber knives 49 and overlap or intersect them, as is clear from Figure 1. The circular knives 40 slightly overlap or intersect the terminal ends of the cutting edges 53, as is clear from the various figures.

The operation of the machine will now be set forth. A fish to be filleted having previously been headed is placed back down and tail first in the chute 3. In this position the back spikes with the flesh of course attached thereto project below the chute, as shown in Figure 4. The fish is then moved in the direction of its length so that its tail passes between the circular knives 19 and 20, which form pairs of parallel slits along the back and tail of the fish closely adjacent to the sides of the back and belly spikes and up to the backbone. The position of the skeleton with respect to the circular knives is clearly shown in Figure 4. The knives 19 being mounted on the vertically swingable arm 22 may be forced upwardly to accommodate the backbone of the fish, which, as is well known, gradually enlarges from the tail towards the head. The chute 3 positions the backbone on the top side so as to just pass along the top edges of the knives 20. The knives 19 may move upwardly as the enlarging spine is forced therebetween so as to insure cutting up to the backbone on the belly side. Most of the weight of the knives 19 and the related mechanism is compensated for by spring 26 so that these knives do not bear heavily on the backbone. The knives 19 and 20 are spaced as close as possible together so as to slice the flesh from the back and belly spikes as close thereto as possible, insuring a maximum recovery of flesh. This operation is clear from Figure 5. The back and belly spikes are shown at BS, passing between the circular knives and having attached thereto a very thin piece of flesh by reason of the necessary spacing of these knives to permit the spikes to pass therebetween. Thus, as illustrated in Figure 5, these knives initially separate the fillets F from the back and belly spikes and close up to the backbone S.

As the fish continues to move in the direction of its length the forward extremities of the knives 49 pass into the incisions made along the back of the fish. This is also clear from Figure 5. Since the cutting edges of the knives 49 gradually diverge it will be seen that the incisions along the back are increased in depth from the back towards the belly of the fish as it continues to move along. This is clear from Figures 6 and 7.

As is clear from Figure 4, the tail end of the framework gradually falls below the cutting edges of the ribbing knives so that they cut across the side faces of the backbone S, thereby slicing the flesh from the sides of the backbone. This occurs after the action of knives 19 and 20 and before the ribbing knives begin to scrape the flesh from the sides of the ribs R, as is clear from Figures 7 and 8.

As the fish moves on to the curved cutting edges 53 the flesh has been severed from around the top side of the backbone S and the diverging longitudinally curved cutting edges 53 begin to scrape the flesh from the outer sides of the ribs R. This is clear from Figures 7, 8 and 9. The longitudinal curve of the cutting edges combined with their divergence causes them to closely hug the outwardly bowed ribs of the fish, thereby completely scraping or removing the flesh from the outer sides of the ribs. During this portion of the movement of the fish the toothed wheels 38 engage the belly side of the backbone in the belly cavity, causing the skeleton to continue to move along substantially the same horizontal plane. In other words, the toothed wheels 38 engage the knuckles of the backbone and continue the forward movement of the fish and at the same time hold it down in between the portions 52 of the knives so that the ascending cutting edges will progressively engage the ribs outwardly towards their ends. At the end of the cutting operation the fillets F may at times remain attached by pieces of skin to the skeleton, which pieces are so positioned by reason of the previous operations so as to be severed by the circular knives 40, as illustrated in Figure 10. It is also apparent from Figure 10 how the toothed wheels 38 cause the ribs R to hug the cutting edges 53 of the knives. Thus the skeleton issues from the knives with substantially all of the flesh scraped therefrom, it having been removed in the form of two solid pieces of meat forming fillets.

From the above description it will be seen that this machine forms a complete mechanism in that a properly prepared fish may be completely filleted. It is to be understood, however, that the ribbing knives may be incorporated with other mechanism to perform a similar function in conjunction therewith. For example, these knives may be substituted for the straight knives disclosed in my above mentioned co-pending application. Likewise the toothed wheels may or may not be employed in conjunction therewith but may have substituted therefor equivalent positioning and feeding mechanism. If desired, of course, the knives 40 may be omitted and the fillets detached when necessary by hand. Likewise the circular knives 19 and 20 need not necessarily be disposed above each other but may be longitudinally displaced.

It is also part of the invention to form the ribbing knives with a longitudinal curve, instead of making them with straight sides, when in the treatment of any particular fish the fillets are thereby more completely and effectively removed. For similar reasons, the forward extremities of these knives may have longitudinally curved cutting edges which are a continuation of the curved cutting edges of the rearward portions when desired.

From the above description it will be apparent that this invention involves certain principles of construction and methods of operation which may be embodied in other physical forms and carried out in other ways without departure from the true scope thereof. I do not, therefore, desire to be strictly limited to this disclosure but rather to the appended claims.

What I seek to secure by Letters Patent is:

1. A method of filleting fish which comprises advancing a fish in the direction of its length, making a pair of parallel incisions from end to end on both sides of the backbone and on opposite sides of the back and belly spikes, which incisions are formed right up to the backbone, and scraping the flesh from the ribs while advancing the fish by engagement with its backbone.

2. A method as described which comprises advancing a fish in the direction of its length, simultaneously making a pair of incisions on the top and bottom sides of the fish and on opposite sides of the back and belly spikes and closely contiguous thereto, and scraping the flesh from the ribs.

3. A method as described which comprises advancing a fish in the direction of its length, simultaneously making a pair of incisions on the top and bottom sides of the fish and on opposite sides of the back and belly spikes and closely contiguous thereto, engaging the fish at its backbone to continue its advance in its direction of length, and scraping the flesh from the ribs.

4. A method of filleting a fish which comprises cutting the flesh from the sides of the back and belly spikes up to the backbone, engaging the fish at its backbone to move it in the direction of its length, and simultaneously scraping the flesh from the ribs.

5. In a method of filleting fish, the steps of advancing a fish in the direction of its length by engaging its backbone and simultaneously scraping the flesh from the ribs.

6. In a method of filleting fish, the step of engaging the fish with a pair of longitudinally curved and divergent cutting edges to scrape the flesh from the ribs.

7. In a method of filleting fish, the steps of engaging the fish with a pair of longitudinally curved and divergent cutting edges to scrape the flesh from the ribs and simultaneously causing the fish to move along a line divergent with respect to the cutting edges.

8. In a method of filleting fish, the steps of making a pair of parallel incisions on opposite sides of the back spikes, closely contiguous thereto and up to the backbone, engaging the backbone on the belly side, and advancing the fish in the direction of its length while simultaneously extending the incisions to scrape the flesh from the ribs.

9. In a fish filleting machine of the type described, the combination comprising a pair of rotatable circular back slitting knives each having a longitudinally curved edge and a pair of ribbing knives.

10. In a fish filleting machine of the type described, the combination comprising a pair of rotatable circular back slitting knives each having a longitudinally curved edge and a pair of ribbing knives, said knives being divergent.

11. In a fish filleting machine of the type described, the combination comprising a pair of rotatable back slitting knives, a pair of ribbing knives each having a longitudinally curved edge, and means for engaging a fish and moving it in the direction of the length of said ribbing knives.

12. In a fish filleting machine of the type described, the combination comprising a pair of rotatable back slitting knives, a pair of ribbing knives, each having a longitudinally curved edge, and means for engaging a fish and moving it in the direction of the length of said ribbing knives, said ribbing knives being divergent in the direction of movement of the fish.

13. In a fish filleting machine, the combination comprising a pair of divergent ribbing knives each having a longitudinally curved edge, and means for feeding a fish in the direction of the length of said knives, said knives acting to scrape the outer sides of the ribs of a fish as it moves past the knives.

14. In a fish filleting machine, a pair of cutting knives each having a longitudinally curved edge, and means for moving a fish along said knives to cut the flesh of a fish from the ribs.

15. In a fish filleting machine, the combination comprising a pair of ribbing knives having straight forward extremities extending into longitudinal rearward extremities each having a longitudinally curved edge, and means for feeding a fish along said knives.

16. In a fish filleting machine, the combination comprising a pair of ribbing knives having forward parallel and straight cutting edges extending into rearward longitudinally curved cutting edges, and means for feeding a fish along said knives.

17. In a fish filleting machine, the combination comprising a pair of ribbing knives having forward parallel and straight cutting edges extending into rearward longitudinally curved cutting edges, and means for feeding a fish along said knives while depressing it therebetween.

18. In a fish filleting machine, the combination comprising a pair of ribbing knives having forward parallel and straight cutting edges extending into rearward longitudinally curved cutting edges, and means for feeding a fish along said knives, said longitudinally curved portions being divergent.

19. In a fish filleting machine, the combination comprising a pair of ribbing knives having forward parallel and straight cutting edges extending into rearward longitudinally curved cutting edges, and means for feeding a fish along said knives while depressing it therebetween, said longitudinally curved portions being divergent.

20. In a fish filleting machine, the combination comprising two pairs of rotatable knives, means for guiding a fish therebetween from one side thereof, ribbing knives each having a longitudinally curved edge mounted on the opposite side of said knives, and means mounted above said curved knives for feeding a fish therealong and pressing it therebetween.

21. In a fish filleting machine, the combination comprising two pairs of rotatable knives, means for guiding a fish therebetween from one side thereof, ribbing knives each having a longitudinally curved edge mounted on the opposite side of said knives, and means mounted above said curved knives for feeding a fish therealong and pressing it therebetween, said means comprising a pair of toothed wheels and means for resiliently supporting them from above.

22. In a fish filleting machine, the combination comprising a support, a supply chute mounted on said support, a pair of rotatable circular knives mounted below said chute, a pair of rotatable circular knives resiliently supported above said chute, ribbing knives mounted in alignment with said chute, and means associated with said ribbing knives for moving a fish therealong and depressing it therebetween.

23. In a fish filleting machine, the combination comprising a support, a supply chute mounted on said support, a pair of rotatable circular knives mounted below said chute, a pair of rotatable circular knives resiliently supported above said chute, ribbing knives mounted in alignment with said chute, and means associated with said ribbing knives for moving a fish therealong and depressing it therebetween, said means comprising a pair of notched wheels resiliently supported above the chute.

24. A filleting tool for a fish-dressing machine comprising a pair of spaced elongated blades positioned adjacent the surface of the machine upon which the fish rests, means for supporting said blades in position in relation to said surface, each of said blades having a pointed forward extremity and a cutting edge which gradually recedes further from said surface as the cutting edge approaches the rear of said blade, said cutting edges also diverging away from each other towards the rear of said blades.

25. A filleting tool for association with the conveyor of a fish-dressing machine, comprising a pair of blades spaced uniformly apart at their lower edges and having their upper edges curved to recede from each other as they approach the rear and to curve upwards away from the lower edges as they approach the rear, said blades having sharpened forward portions and their upper edges formed as cutting edges.

26. A filleting tool as specified in claim 25 having means under which the prismatic portion of the backbone rides to hold it in contact with the curved cutting edges.

27. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone.

28. A filleting tool for mechanically removing the flesh from the prismatic portion of the backbone of a decapitated and eviscerated fish of the class described, comprising a pair of blades spaced apart for the passage of the backbone between them, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone, said filleting tool having associated therewith means for causing the prismatic bone of the fish to contact with the filleting blades to enable said blades to follow the longitudinal curvature of said bone.

29. A filleting tool for mechanically removing the flesh from the prismatic portion of the backbone of a decapitated and eviscerated fish of the class described, comprising a pair of blades spaced apart for the passage of the backbone between them, a conveying element situated between the blades of the tool and engageable with the backbone of the fish to convey it through the space between the blades, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone.

30. A filleting tool for mechanically removing the flesh from the prismatic portion of the backbone of a decapitated and eviscerated fish of the class described, comprising a pair of blades spaced apart for the passage of the backbone between them, a toothed wheel rotatable between the blades of the tool and engageable with the backbone of the fish to convey it through the space between the blades, and means for mounting said blades to operate upon the sides of the prismatic portion of the backbone, each blade having a pointed forward extremity, an elongated narrow portion in the rear thereof, and a portion which gradually increases in width towards its rear and has a curved cutting edge which conforms to the curved shape of the sides of the prismatic bone so as to cut close to the sides of said bone.

31. In a fish-dressing machine, a fish conveyor, means for holding the fish on the conveyor after it has been decapitated and eviscerated, means for slitting the fish on each side of the oval portion of the backbone, and means for filleting the fish, comprising blades having cutting edges curved to make a cut that conforms to the curved shape of the sides of the prismatic portion of the backbone.

WILLIAM H. HUNT.